United States Patent [19]
Cote et al.

[11] Patent Number: 6,054,009
[45] Date of Patent: Apr. 25, 2000

[54] METHOD OF APPLYING A DISC SURFACE PROTECTIVE COVER

[75] Inventors: Armand G. Cote, Leicester; Ronald L. Gadbois, Douglas, both of Mass.

[73] Assignee: Armron Corporation, Douglas, Mass.

[21] Appl. No.: 09/084,649

[22] Filed: May 26, 1998

Related U.S. Application Data

[60] Provisional application No. 60/048,425, Jun. 3, 1997.

[51] Int. Cl.⁷ .................................................. B32B 31/04
[52] U.S. Cl. ............................................................ 156/249
[58] Field of Search ..................................... 156/247, 249; 369/283, 286, 291; 428/41.8

[56] References Cited

U.S. PATENT DOCUMENTS

| | | | |
|---|---|---|---|
| 4,879,710 | 11/1989 | Iijima | 369/291 |
| 4,983,437 | 1/1991 | Merrick . | |
| 5,099,618 | 3/1992 | Schmid | 51/326 |
| 5,102,099 | 4/1992 | Brown et al. | 51/129 |
| 5,415,914 | 5/1995 | Arioka et al. | 428/64 |
| 5,571,041 | 11/1996 | Leikam | 451/63 |
| 5,732,979 | 3/1998 | Finke et al. . | |
| 5,757,765 | 5/1998 | Chen | 369/291 |
| 5,770,289 | 6/1998 | Tracy . | |
| 5,783,031 | 7/1998 | Sievers . | |
| 5,787,069 | 7/1998 | Lowe et al. | 369/291 |
| 5,922,430 | 7/1999 | Biddlecome | 369/291 X |
| 5,925,200 | 7/1999 | Grossman . | |
| 5,958,177 | 9/1999 | Claussnitzer . | |

FOREIGN PATENT DOCUMENTS

| | | |
|---|---|---|
| 0 422 774 | 4/1991 | European Pat. Off. . |
| 9-270177 | 10/1997 | Japan . |
| 97/05609 | 2/1997 | WIPO . |

*Primary Examiner*—M. Curtis Mayes
*Attorney, Agent, or Firm*—Nields, Lemack & Dingman; Brian M. Dingman

[57] ABSTRACT

An improved plastic covering, for protecting the top surface of a digital disc, which permanently bonds to the disc and a method for applying the same.

2 Claims, 2 Drawing Sheets

METHOD OF APPLYING A DISC SURFACE PROTECTIVE COVER

CROSS REFERENCE TO RELATED APPLICATION

This application claims the benefit of U.S. Provisional Ser. No. 60/048,425 filed Jun. 3, 1997.

FIELD OF THE INVENTION

This invention relates to digital discs and more specifically to a plastic covering, for protecting the top surface of a digital disc, which permanently bonds to the disc surface and a method for applying the same.

BACKGROUND OF THE INVENTION

Compact disks, CD ROMs, CD game disks, digital video disks and other similar media are in use to carry computer-readable data. In such disks, the data is encoded in a layer which is just below the top surface (the label side) of the disk. The data is read through the bottom surface of the disk. Scratches in the bottom surface can cause data read errors. However, users have been educated to handle the disks carefully to avoid such scratches. Most users are not aware that scratches in the top surface can easily destroy the encoded data, a phenomenon which is particularly problematic with disks which are rented or leased, and thus handled frequently by persons who do not own the disk and may not care for it properly.

SUMMARY OF THE INVENTION

It is therefore a primary object of this invention to provide a protective covering for a digital disc.

It is a further object of this invention to provide a protective covering for a digital disc which permanently adheres to the disc surface.

It is a further object of this invention to provide a durable protective covering for a digital disc.

It is a further object of this invention to provide a protective covering for a digital disc that is easily and quickly applied to the surface of the disc.

It is a further object of this invention to provide a protective covering adapted for the top surface or label side of a digital disc.

It is a further object of this invention to provide a covering which protects against damage to digital data stored in s digital disc caused by digs scratches through the top surface of the digital disc.

This invention results in a disk top surface which is much less susceptible to scratches and other similar damage. This is accomplished by the application of a thin sheet of clear, flexible plastic material onto the label side of a disk. A permanent is used so that the protective sheet does not lift from the surface. The adhesive adheres the film to the label (which is typically a water-based ink), and/or the disk material (typically polycarbonate) itself, depending on the configuration of the disk.

A preferred embodiment of the protective covering of this invention for a digital disc comprises a flexible plastic sheet having an inner and outer perimeter proportional to an inner and outer perimeter of the digital disc and a bottom surface; and an adhesive, provided on the bottom surface, which is capable of permanently bonding to a top side of the digital disc. The inner and outer perimeters of the plastic sheet are preferably annular to correspond to the typically annular inner and outer perimeters of digital discs. The plastic sheet is preferably a vinyl material and may have a thickness of about $1 \times 10^{-3}$ to $4.5 \times 10^{-3}$ inches, although preferably $3.5 \times 10^{-3}$ inches.

The preferred embodiment may further comprise a backing which is removably affixed to the bottom surface so that the adhesive is between the sheet and the backing. The backing may be scored and may further comprise an outer perimeter corresponding to the outer perimeter of the plastic sheet.

A preferred embodiment of the method of the invention for applying an improved protective covering for a digital disc, comprises the steps of: providing a flexible plastic sheet having an inner and outer perimeter proportional to an inner and outer perimeter of the digital disc and a bottom surface, two or more tabs removably affixed to the outer perimeter of the plastic sheet, and an adhesive, provided on the bottom surface, which is capable of permanently bonding to a top side of the digital disc; grasping the tabs and peeling said plastic sheet from a backing, which is removably affixed to the bottom surface so that the adhesive is between the sheet and the backing, without touching the bottom surface of the plastic sheet; flexing the plastic sheet so that the inner perimeter of the plastic sheet is flexed away from the tabs; centering the inner perimeter of the plastic sheet over the inner perimeter of the top side of the digital disc so that the inner perimeter of the plastic sheet is slightly touching the digital disc around the inner perimeter of the digital disc; releasing the plastic sheet so that the sheet falls flat and centered over the top side of the digital disc; and removing the tabs from the plastic sheet.

The method of applying the covering may further comprise the steps of, smoothing the plastic sheet from the inner perimeter of the plastic sheet outward radially to the outer perimeter of the plastic sheet; and pressing around the inner perimeter of the plastic sheet and then the outer perimeter of the plastic sheet.

This invention is the result of efforts to design a covering for the top side of digital disc which would protect the digital data stored just below the top surface from digs and scratches which might occur on the top surface. The covering and method of the invention may be adapted to any size or shaped digital disc.

BRIEF DESCRIPTION OF THE DRAWINGS

Other objects, features and advantages will occur to those skilled in the art from the following description of a preferred embodiment and the accompanying figures in which.

DETAILED DESCRIPTION OF THE PREFERRED EMBODIMENT

The improved protective covering of the invention for the top surface of a digital disc generally comprises, a flexible plastic sheet having an inner and outer perimeter proportional to an inner and outer perimeter of said digital disc and a bottom surface; an adhesive, provided on said bottom surface, which is capable of permanently bonding to a top side of said digital disc; and a backing which is removably affixed to said bottom surface so that said adhesive is between said sheet and said backing.

Figure 1:
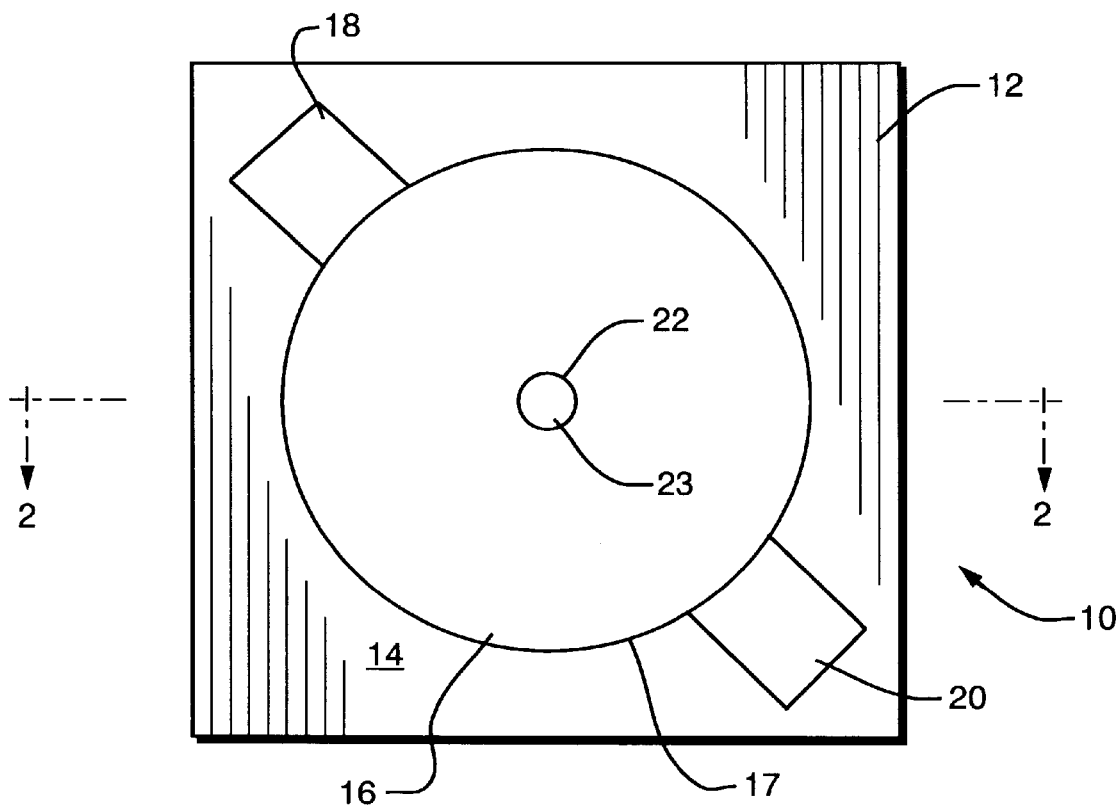
FIG. 1 is a top view of a disk surface protective cover according to this invention, in a preferred from before its application to a disk.
Figure 2:
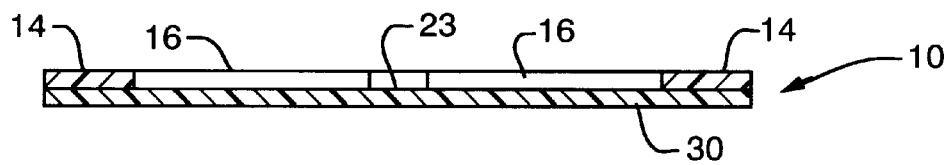
FIG. 2 is a cross-sectional view taken along line A—A of FIG. 1.

Disk surface protective cover 16 according to this invention is made of a clear, tough, flexible plastic film pre-applied with an adhesive which is capable of permanently fixing the film to the label or top side of a compact disk-type product. In the embodiment shown in the drawings, cover 16 is mounted to a removably backing material 30, FIG. 2. Cover 16 is preferably formed by die cutting the desired shape in a 1–4.5 mil, preferably 3.5 mil, clear high gloss vinyl with a permanent adhesive and a removable backing thereon. Such material is available from plastics manufacturers and is commonly used for such items as point of purchase displays. Product/company information, instructions and/or any other information or images can be printed on this material as desired.

Sheet 12 of such material is "kiss" cut through the plastic film, but not backing, with an appropriate die to create the annular cover 16 defined by circular circumferential cut 17 and circular internal cut 22. Circular internal cut 22 accomplishes central hole 23. Tabs 18 and 20 are connected to cover 16 with small bridging pieces of the plastic material by leaving one or two small uncut areas where cut 17 meets tabs.

Figure 3:
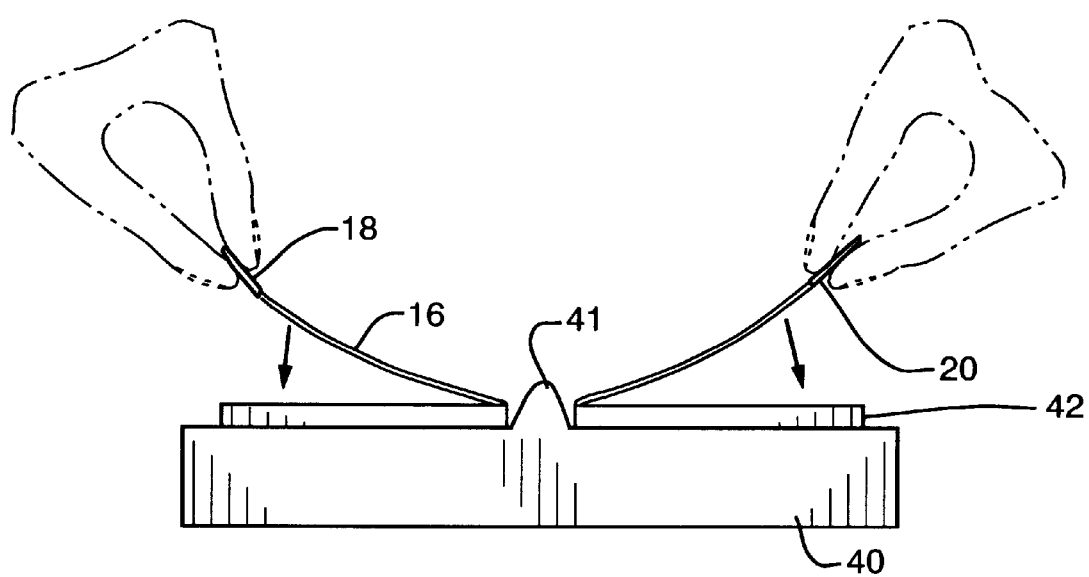
FIG. 3 is a cross-sectional, schematic view of a disk surface protective cover of this invention being applied to the label side of a disk.

As shown in FIG. 3, tabs 18 and 20 are grasped by the user during application of cover 16 to disk 42. Cover 16 is applied to disk 42 as follows. The user bends assembly 10 sufficiently to grasp tab 18 or 20. The tab is then lifted away from backing 30. Portion 14 of plastic layer 12, which is the portion outside of annular area 16 and tabs 18 and 20, is left on backing 30, along with central circular cutout 23. The other tab is then grasped by the other hand. The film is flexed by bringing the hands close together, such that the central portion of cover 16 is lowest, as shown in FIG. 3. The center hole of cover 16 is aligned with guide pin 41 of base member 40, and cover 16 is gently touched to disk 42. The user then releases cover 16, which falls naturally onto disk 42. In order to ensure good adhesion of film 16 to disk 42, a lint free cloth is used to press the cover onto the disk starting from the center and rubbing radially toward the outside of the disk, at about 6–8 locations around the face of the disk. Installation is finished by pressing the cover along the inside of the center hole and along the outside edge of the disk. Air bubbles can be removed by applying steady pressure toward the edge of the disk. If such is unsuccessfully, a pinhole can be made through the cover over the bubble and then the cover pushed down flat. If the alignment of the cover to the disk is incorrect, the cover can be removed and realigned before any pressure is applied to the cover.

Once cover 16 is applied, remove tabs 18 and 20 by carefully tearing them off of cover 16 along the perforated edge connecting the tabs to cover 16.

Portions of the cover may be pre-printed with a light colored ink to provide areas which can be written on with a felt tip pen. Another alternative is to pre-cut the plastic disk and tabs, so that the backing is the same size and shape as the film. Similar to bumper stickers, the backing is then scored so that it can be removed from the plastic film.

The protective covering of this invention may be adapted to all digital discs. Although specific features of the invention may be shown in some drawings and not others, this is for convenience only as some feature may be combined with any or all of the other features in accordance with the invention.

Other embodiments will occur to those skilled in the art and are within the following claims:

What is claimed is:

1. A method for applying an improved protective covering for a digital disc, comprising the steps of, providing a flexible plastic sheet having an inner and outer perimeter proportional to an inner and outer perimeter of said digital disc and a bottom surface, two tabs removably affixed to said outer perimeter of said plastic sheet, and an adhesive, provided on said bottom surface, which is capable of permanently bonding to a top side of said digital disc;

grasping said tabs and peeling said plastic sheet from a backing, which is removably affixed to said bottom surface so that said adhesive is between said sheet and said backing, without touching the bottom surface of said plastic sheet;

flexing said plastic sheet so that said inner perimeter of said plastic sheet is flexed away from said tabs;

centering said inner perimeter of said plastic sheet over said inner perimeter of said top side of said digital disc so that said inner perimeter of said plastic sheet is slightly touching said digital disc around said inner perimeter of said digital disc;

releasing said plastic sheet so that said sheet falls flat and centered over said top side of said digital disc; and removing said tabs from said plastic sheet.

2. The method of claim 1, further comprising the steps of, smoothing the plastic sheet from the inner perimeter of said plastic sheet outward radially to the outer perimeter of said plastic sheet; and pressing around the inner perimeter of said plastic sheet and then said outer perimeter of said plastic sheet.

* * * * *